United States Patent [19]
Carr

[11] 3,717,373
[45] Feb. 20, 1973

[54] VARIANCE COMPENSATOR FOR CHASSIS-TO-CONTAINER LOCKING MECHANISM

[75] Inventor: George W. Carr, Cincinnati, Ohio
[73] Assignee: Pullman Incorporated, Chicago, Ill.
[22] Filed: Dec. 15, 1970
[21] Appl. No.: 98,375

[52] U.S. Cl............296/35 A, 105/366 R, 248/361 R, 280/DIG. 8
[51] Int. Cl. ...............................................B60p 7/08
[58] Field of Search......296/35 A; 280/179 R, 415 B, 280/DIG. 8; 105/366 R, 366 C, 366 D; 248/119 R, 361 R; 220/1.5

[56] References Cited

UNITED STATES PATENTS

| 2,972,175 | 2/1961 | Abolins | 280/DIG. 8 |
| 3,294,420 | 12/1966 | Martin | 280/415 B |
| 3,363,803 | 1/1968 | Abolins | 280/DIG. 8 |

Primary Examiner—Leo Friaglia
Assistant Examiner—Leslie J. Paperner
Attorney—Hilmond D. Vogel and Richard J. Meyers

[57] ABSTRACT

A variance compensator which is in the form of a two-part elongated structure insertable through the vertical opening in a corner casting which receives a horizontally extending locking pin from an associated trailer chassis, the compensator being in overlapping relation with the locking pin for adjusting for dimensional tolerances in the horizontal spacing between the interlocked chassis and container arrangement. The compensator includes a first member having a horizontal rod portion having a cradle supporting the overlapping chassis locking pin and extending into the corner casting and a second handle member spring biased with the first member for placing the compensator in the container corner casting and retrieving it from the container corner casting by retraction of the handle member against the spring and the first member.

13 Claims, 6 Drawing Figures

PATENTED FEB 20 1973 3,717,373

INVENTOR.
GEORGE W. CARR
BY Richard J. Myers
ATTORNEY

PATENTED FEB 20 1973  3,717,373

INVENTOR
GEORGE W. CARR
BY Richard J. Myers
ATTORNEY

3,717,373

VARIANCE COMPENSATOR FOR CHASSIS-TO-CONTAINER LOCKING MECHANISM

BACKGROUND OF THE INVENTION

1. Field of the Invention

This invention relates to the locking of containers horizontally to the container supporting means as, for instance, a chassis of a highway trailer.

2. Description of the Prior Art

It is known to provide for horizontal locking pin structure mounted on the chassis and coupling the chassis of the trailer or the like for securing the container on the chassis. However, in some instances the chassis may be relatively distorted with respect to the container and the distortion may be to such an extent that the gap between the chassis front cross member and the corner casting of the container can be judged an unsafe locking condition. It is the purpose of this invention to eliminate such an unsafe locking condition.

SUMMARY OF THE INVENTION

This invention relates to locking means between a container and its supporting structure as, for instance, the chassis of a highway trailer. More specifically, it is an object and purpose of this invention to provide a variance compensator fixture insertable into the corner casting and cradle extending outwardly thereof to cradle a chassis-mounted locking pin. The variance compensator fixture is designed for use in emergency cases to enable the carrier to lock the container on a slightly distorted chassis. It is used on chassis with horizontal locking pins which engage the front holes of the bottom corner castings of the containers. The variance compensator is inserted in the container corner casting to insure positive locking conditions and safety in moving the container such as on a railroad car or over the road.

Another object of this invention is to provide for a variance compensator fixture which comprises a first member which extends outwardly from the container corner casting underneath the locking pin, and a second member biasingly connecting it with the first member provided with a handle portion for inserting the fixture into and withdrawing the fixture from the interior of the container corner casting.

These and other objects will become more apparent from reference to the following description, appended claims and attached drawings.

DESCRIPTION OF THE PREFERRED EMBODIMENT

Figure 1:
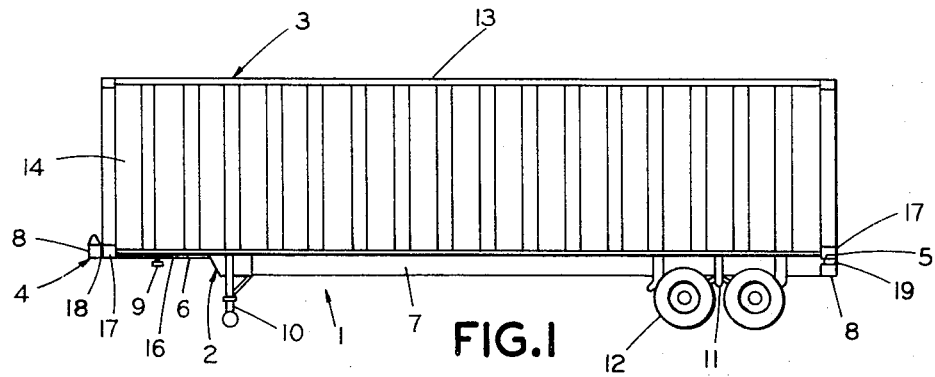
FIG. 1 is a general side elevation view of the chassis and removable container including the forward and rearward container locks.
Figure 2:
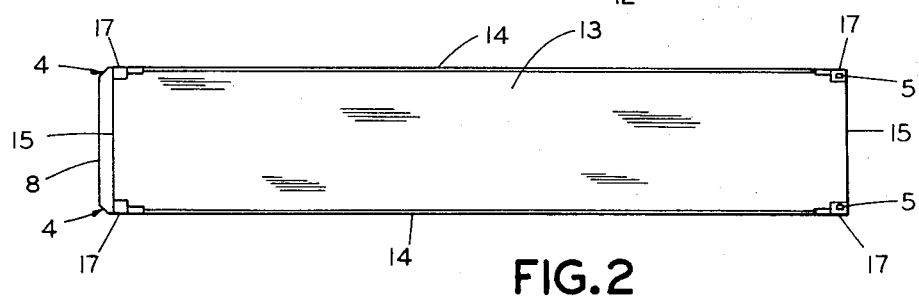
FIG. 2 is a plan view of the coupling of the container and chassis.

With reference to the drawings and in particular with reference to FIGS. 1 and 2, there is shown a trailer 1 including a chassis 2 supporting a removable container 3 thereon. The container is coupled to the chassis by a front pair of chassis-to-container locking means 4 and a rear pair of chassis-to-container hold-down locking means 5. The locking means 4 provide for horizontally extendable coupling with the container and the locking means 5 provide for vertical extending coupling with the container. The chassis incorporates a main frame 6 including longitudinal members and end cross members 8. The kingpin 9 depends from the forward end of the chassis, and rearwardly thereof the landing gear 10 and then the suspension system 11 and wheel 12 are located. The container 3 is provided with a top 13, sides 14, end walls 15, a bottom 16 and bottom corner castings 17 each having an end opening 18 and a bottom opening 19.

Attention is now to be directed to the views shown in FIGS. 3–6 wherein there is shown a variance compensator 20 which is placed in the container corner casting 17 of the container 3 to enable the carrier to lock the container on the forward or front cross member 8 of the trailer chassis 2 when the front cross member 8 is provided at its lateral ends with horizontal locking pin structures such as, for instance, shown in my co-pending application having Docket No. 70118 T and bearing Ser. No. 98,344 and having the same filing date as the instant application, namely Dec. 15, 1970. In the aforesaid co-pending application and in the prior art, there is shown locking pins mounted on the chassis cross member of a trailer which locking pin may be moved by any means horizontally into the openings of the container corner castings for securing the container on the chassis. In this regard, with reference to FIG. 3, there is shown a horizontally reciprocal locking pin 20a mounted at an end of the chassis cross member and extendable longitudinally into the opening 18 of the corner casting 17 of the container 3.

Figure 3:
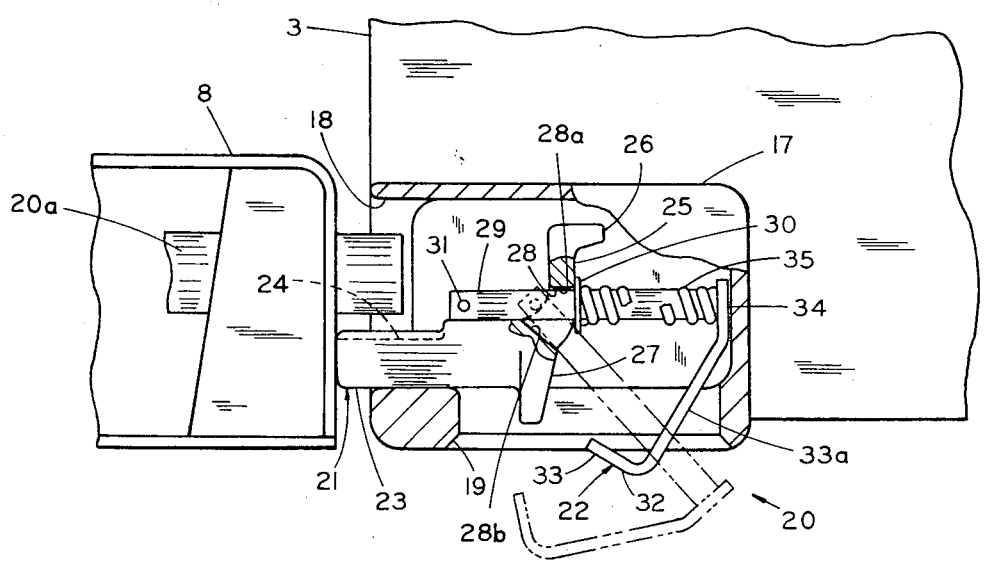
FIG. 3 is a partial side elevational view of the chassis and container and illustrating the function of the compensator device.
Figure 4:
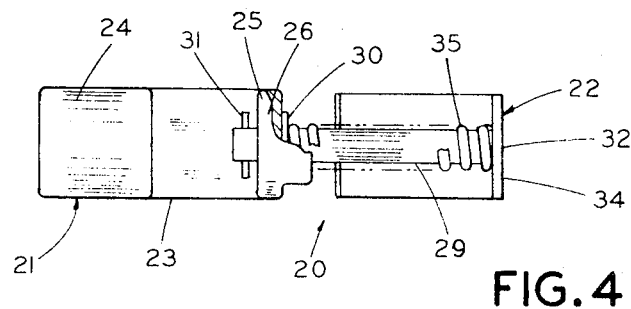
FIG. 4 is a plan view of the compensator device.

The variance compensator structure 20 comprises an elongated longitudinally extending compensator lock member 21 biasingly coupled with a longitudinally extending elongated compensator guide member 22 which, in FIG. 3, is shown disposed within the corner casting in a horizontal compressed condition in solid line and wherein the handle 32 of the guide member is also shown hanging downward in a dotted line position.

Figure 5:
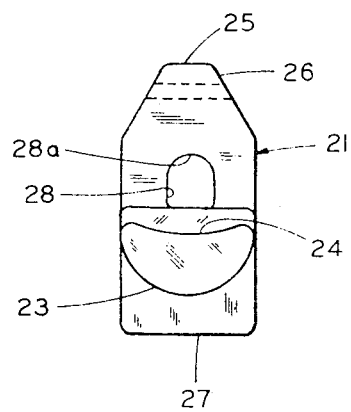
FIG. 5 is an end view of the compensator lock member of the compensator device.

The lock member 21 has a forwardly projecting portion or locking support portion that is rod-like in appearance and has on its top thereof a dished or scalloped shelf portion 24 for cradling the locking pin 20a as shown, for instance, in FIGS. 3 and 5. Just rearwardly of the rod portion 23 there is shown an upper rear part or moment arm 25 having a top head portion 26 extending rearwardly. The moment arm 25 in projecting upwardly adjacent the top of the inside of the corner casting acts as an upper limit for movement of the lock member upwardly where loads would be directed upwardly against the portion of the rod 23 that projects outwardly of the housing (see FIG. 3) and this results in vertical stability of the compensator within the corner casting. The lock member 21 also has a depending tong or guide portion 27 below the moment arm 25 and depending as a projection below the rod portion 23. The guide portion 27 allows for lateral stability of the lock member providing a base portion that fits in the corner casting opening. Consequently, since the lateral extent of the portion 27 is more or less approximate the width of the corner casting opening it cannot rotate (see FIG. 5). At the juncture of the moment arm 25 with the support rod portion 23 there is provided a slot or wide opening 28 in the neck of the moment arm 25. The slot 28 includes an upper horizontal surface portion 28a and a lower downwardly inclined surface portion 28b. The guide member or tong 22 includes a spring guide pin 29 that is biased outwardly from and is connected with the lock member 21. The guide pin 29 has a movable retainer or washer 30 movably mounted on it outwardly of the lOck member 21 rearwardly of the moment arm 25 and a horizontal cross pin 31 is provided at the forward end of the guide pin 29. The cross pin 31 prevents removal of the guide pin 29 which extends through the opening 28. The rear end of the guide pin 29 is provided with a handle 32 which has a vertically downwardly extending portion of rear spring retainer part 34, a handle shank portion 33a inclined downwardly and forwardly and a handle end part 33 perpendicular to the part 33a and extending upwardly and forwardly thereof. The retainer part 34 is attached to the rear end of the pin 29 by weld w and a spring 35 is mounted around the pin 29 and is placed between the forward face of the handle retainer part 34 and the rear face of the washer 30, the spring tending to urge the pin rearwardly and outwardly of the opening in the moment arm were it not for the fact that the rear wall of the container corner casting interior, as seen in FIG. 3, prevents this from happening so that the forward part of the pin 29 rests on top of the locking support portion 23 just rearwardly of the dished out cradle portion 24.

As shown in FIG. 3, the compensator guide portion is inserted into the bottom opening 19 of the corner casting (normally when the container is on the chassis) by having the handle portion and pin depending downwardly as shown in dotted line. Then the handle is swung upwardly with compression of the spring 35 until the handle and pin are in the upright position (solid line position in FIG. 3) with the lock member 21 being forced outwardly of the forward opening in the corner casting of the container. The compensator is used only when the gap between the front corner casting of the container and the front cross member of the chassis is judged as unsafe. The front face of the variance compensator lock member 21 will be terminated in its forward movement by the rear wall of the front cross member of the chassis. Thus the handle assembly is pushed up to deflect the spring enough to swing the rear end of the handle up to the horizontal position and then the locking pin 20a in the front cross member is extended to its locked position. This installation shows that if the gap between the chassis cross member and the container is increased up to the maximum of the compensator extension or even more, and the locking pin is away from the front wall of the corner casting, the safety of the locking condition is not reduced. The dished shelf 24 of the compensator will act on the locking pin in case of any upward movement of the container. At the time of humping movement, as the trailer moves along the highway the maximum force which can be exerted on the front cross member by the compensator is only the force of the spring.

Figure 6:
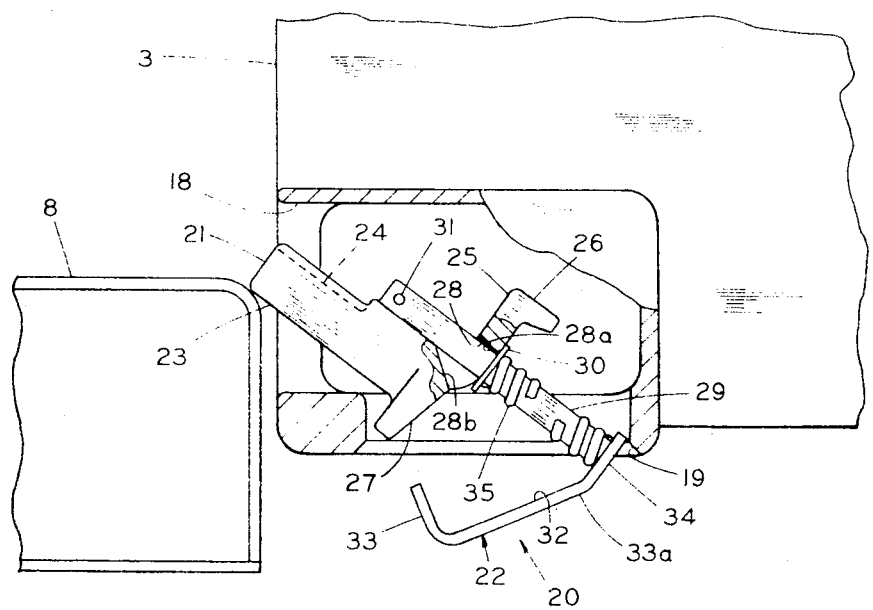
FIG. 6 is a view similar to FIG. 3 but with the compensator device in a different position, as in operation, when the container is being lowered on the chassis.

FIG. 6 illustrates the situation where the crane operator lowers the container without removing the compensator. The compensator will be forced to adjust, preventing any serious damage to the chassis or compensator. It will be noted that the guide member 22, due to the enlarged opening 28 and the pin 31, has a loose freely swingable pivotal connection with the lock member 21.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A variance compensator structure for cooperating with a horizontal locking pin means for coupling a container to its support, comprising:
   a variance compensating lock member adapted for placement within an opening within the container and adapted to underline a horizontally extending locking pin mounted on the support for extension into the opening of the container,
   vertically extending guide means on the lock member adapted to maintain the lock member in a horizontal position within the container opening,
   a movable guide member horizontally and reciprocally supported within said lock member and extending outwardly therefrom and being adapted to be stored within the container opening with the end of the lock member extending outwardly therefrom, and
   biasing means between the lock member and the guide member urging the two members away from one another whereupon the guide member is urged inwardly of the container opening and the lock member is urged outwardly of the opening for juxtaposition underneath support locking pin means.
2. The invention according to claim 1, and
   said lock member being provided with an upwardly facing cradle surface portion adapted for engagement with the locking pin means.
3. The invention according to claim 1, and
   said guide means including an upwardly extending moment arm adapted for engagement with the inside top of the container opening for pivoting of the compensator structure and alignment thereof within the container opening.
4. The invention according to claim 1, and
   said guide means including an upwardly extending moment arm adapted for engagement with the top inside of the container opening for pivoting of the compensator structure and alignment thereof within the opening, and
   a depending guide portion cooperative with the upper moment arm in aligning the lock member horizontally within the container opening.
5. The invention according to claim 1, and
   said guide member being pivotally connected to said lock member and having a handle portion for directing of the lock member into the opening in the container.

6. The invention according to claim 1, and
an opening in the lock member receiving the guide means and being greater in diameter than the guide member for allowing swinging pivotal movement of the guide member with respect to the lock member.

7. The invention according to claim 1, and
said guide member including a handle inclined away from the inside end of the opening of the container to permit easy insertion and removal of the compensator structure from within the container opening.

8. The invention according to claim 7, and
said biasing means being located between the guide means and the handle of the guide member.

9. A variance compensator structure for cooperating with a horizontal locking pin means attached to a trailer chassis for coupling of a container to the trailer chassis comprising:
a variance compensating lock member adapted for placement within an opening within a container corner casting and adapted to underline a horizontally extending locking pin mounted on the trailer chassis for extension into the opening of the container corner casting,
vertically extending guide means on the lock member adapted to maintain the lock member in a horizontal position within the container corner casting opening,
a movable guide member horizontally and reciprocally supported within said lock member and extending outwardly therefrom and being adapted to be stored within the container corner casting opening with the end of the lock member extending outwardly therefrom, and
biasing means between the lock member and the guide member urging the two members away from one another whereupon the guide member is urged inwardly of the container corner casting opening and the lock member is urged outwardly of the opening for juxtaposition underneath the trailer chassis locking pin means.

10. The invention according to claim 9, and
said chassis being provided with a cross member and said locking pin means being mounted at the lateral end of the cross member for insertion into the opening of the container corner casting and disposed above said lock member of the variance compensator structure.

11. The invention according to claim 9, and
said guide means including an upwardly extending moment arm adapted for engagement with the top inside of the container corner casting for pivoting the compensator structure and alignment thereof within the corner casting.

12. The invention according to claim 9, and
said guide means including an upwardly extending moment arm adapted for engagement with the top inside of the container corner casting opening for pivoting of the compensator structure and alignment thereof within the opening, and
a depending guide portion cooperative with the upper moment arm in aligning the lock member horizontally within the container corner casting opening.

13. The invention according to claim 9, and
said guide member being pivotally connected to said lock member and having a handle portion for directing of the lock member into the opening in the container corner casting.

* * * * *